(12) United States Patent
Ding et al.

(10) Patent No.: US 10,416,892 B2
(45) Date of Patent: Sep. 17, 2019

(54) FILESET-BASED DATA LOCALITY ENABLEMENT IN DISTRIBUTED FILE SYSTEMS

(71) Applicant: International Business Machines Corporation, Armonk, NY (US)

(72) Inventors: Cheng Ding, Beijing (CN); Shuo Feng, Beijing (CN); Lin Feng Shen, Beijing (CN); Zheng Cai Yuan, Beijing (CN); Yong Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 15/191,561

(22) Filed: Jun. 24, 2016

(65) Prior Publication Data

US 2017/0371540 A1    Dec. 28, 2017

(51) Int. Cl.
*G06F 12/00*   (2006.01)
*G06F 3/06*    (2006.01)
*G06F 16/182*  (2019.01)

(52) U.S. Cl.
CPC .............. *G06F 3/061* (2013.01); *G06F 3/064* (2013.01); *G06F 3/067* (2013.01); *G06F 3/0664* (2013.01); *G06F 16/182* (2019.01)

(58) Field of Classification Search
None
See application file for complete search history.

(56) References Cited

U.S. PATENT DOCUMENTS

| | | | |
|---|---|---|---|
| 7,634,453 B1 | 12/2009 | Bakke et al. | |
| 7,769,974 B2 | 8/2010 | Bhansali et al. | |
| 8,280,916 B2 | 10/2012 | Krishnaswamy | |
| 8,972,986 B2 | 3/2015 | Palanisamy et al. | |
| 2012/0066677 A1 | 3/2012 | Tang | |
| 2014/0006357 A1* | 1/2014 | Davis | G06F 11/1464 707/667 |
| 2014/0059310 A1 | 2/2014 | Du et al. | |
| 2015/0220359 A1 | 8/2015 | Castillo et al. | |
| 2015/0333994 A1* | 11/2015 | Gell | H04L 43/0882 709/224 |

OTHER PUBLICATIONS

Chung et al., "Maximizing data locality in distributed systems", Journal of Computer and System Sciences 72 (2006) 1309-1316, received in revised form Jun. 1, 2006, © 2006 Elsevier Inc., doi:10.1016/j.jcss.2006.07.001, pp. 1309-1316.

(Continued)

*Primary Examiner* — Baboucarr Faal
(74) *Attorney, Agent, or Firm* — Gilbert Harmon, Jr.

(57) ABSTRACT

An approach, for fileset based data locality management in Distributed File Systems. A data locality manager receives fileset identifiers and associated block allocation information, for storing in data block locality tables. The data locality manager determines data block locality factors based on the fileset identifiers and the block allocation information, creating a collection of the data block locality factors. The data locality manager stores the collection of the data block locality factors in the data block locality tables. The data locality manager receives the fileset identifiers for determining the collection of the data block locality factors associated to the fileset identifiers and outputs the collection of the data block locality factors.

20 Claims, 6 Drawing Sheets

(56) References Cited

OTHER PUBLICATIONS

Green, James, "New Whitepaper: Hyperconvergence and Its Effect on It", ActualTech Media, Jan. 2016, <http://www.hyperconverged.org/>, © 2014, 3 pages.

Khan et al, "Data Locality in Hadoop Cluster Systems", 2014 11th International Conference on Fuzzy Systems and Knowledge Discovery, 978-1-4799-5148-2/14, © 2014 IEEE, pp. 720-724.

Kurian et al., "Locality-Aware Data Replication in the Last-Level Cache", <http://people.csail.mit.edu/devadas/pubs/acc-hpca14.pdf>, printed on Apr. 15, 2016, 12 pages.

Lee et al., "Dynamic Limited Directory Scheme using Data Locality", © 2000 IEEE, 0-7695-0589-2/00, pp. 154-157.

Lee et al., "Efficient Data Replication Scheme based on Hadoop Distributed File System", International Journal of Software Engineering and Its Applications, vol. 9, No. 12 (2015), pp. 177-186, <http://dx.doi.org/10.14257/jseia.2015.9.12.16>, ISSN: 1738-9984 IJSEIA, Copyright © 2015 SERSC.

Mell et al., "The NIST Definition of Cloud Computing", NIST, National Institute of Standards and Technology, U.S. Department of Commerce, Special Publication 800-145, Sep. 2011, 7 pages.

Wang et al., "Data Locality in MapReduce: A Network Perspective", Fifty-second Annual Allerton Conference Allerton House, UIUC, Illinois, USA, Oct. 1-3, 2014, © 2014, pp. 1110-1117.

Zhang et al., "An Effective Data Locality Aware Task Scheduling Method for MapReduce Framework in Heterogeneous Environments", 2011 International Conference on Cloud and Service Computing, 978-1-4577-1637-9/11, © 2011 IEEE, pp. 235-242.

"Converged infrastructure", Wikipedia, the free encyclopedia, <https://en.wikipedia.org/wiki/Converged_infrastructure>, page was last modified on Mar. 4, 2016, 2 pages.

"Docker (software)", Wikipedia, the free encyclopedia, <https://en.wikipedia.org/wiki/Docker_(software)>, page was last modified on Apr. 14, 2016, 3 pages.

"Locality and the Fast File System", Operating Systems [Version 0.91], © 2014, Arpaci-Dusseau, <http://pages.cs.wisc.edu/~remzi/OSTEP/file-ffs.pdf>, pp. 1-12.

* cited by examiner

| Fileset ID | Node ID | Blocks | Total bytes (MB) | Weight | Data_directory |
|---|---|---|---|---|---|
| F1 | N1 | 120 | 15,360 | 1 | /gpfs/hadoop1 |
| | N2 | 2 | 256 | 4 | /gpfs/hadoop1 |
| | N3 | 7 | 896 | 3 | /gpfs/hadoop1 |
| | N4 | 12 | 1,536 | 2 | /gpfs/hadoop1 |
| F2 | N1 | 10 | 1,280 | 3 | /gpfs/hadoop2 |
| | N2 | 145 | 18,560 | 1 | /gpfs/hadoop2 |
| | N3 | 15 | 1,920 | 2 | /gpfs/hadoop2 |
| | N5 | 160 | 20,480 | 4 | /gpfs/hadoop2 |
| | N6 | 3 | 384 | 5 | /gpfs/hadoop2 |
| F3 | N1 | 12 | 1,536 | 1 | /gpfs/hadoop1 |
| | N3 | 4 | 512 | 3 | /gpfs/hadoop1 |
| | N4 | 16 | 2,048 | 2 | /gpfs/hadoop1 |

FILESET-BASED DATA LOCALITY ENABLEMENT IN DISTRIBUTED FILE SYSTEMS

BACKGROUND OF THE INVENTION

The present invention relates generally to distributed file systems and more particularly, to enabling data locality inside Virtual Machine (VM) containers for Hyper-Converged systems.

Distributed File System (DFS) is a class of file systems that can be used for cloud-based big data analysis and can provide access to files shared via a network from multiple hosts. DFS also makes it possible for multiple users to share the files and data simultaneously. DFS can manage large filesets (e.g., groups of files greater than 1 TB) where filesets are stored in data blocks across a plurality of physical nodes. When a file is shared, data blocks can be replicated to a plurality of nodes where each application instance can access a respective replica. Data locality, in a DFS, is an identification of where data blocks resides in a plurality (e.g., cluster) of computing/physical nodes.

In Hyper-Converged (H-C) systems, an Information Technology (IT) infrastructure can combine servers, data storage devices, networking equipment and software as a single optimized IT infrastructure. In addition, H-C systems incorporate virtualization technology to achieve what is known in the art as "elasticity." Elasticity can be characterized by having features such as, but not limited to, Virtual Machine (VM) centricity, data protection, VM mobility, High Availability (HA). A VM instance and/or data processing job can be scheduled/launched on the node that comprises a majority of the data that the VM/job will operate. When a H-C system scheduler launches and/or instantiates a VM/job on a node where a majority of data resides, network traffic and job execution time are optimized. The determination process of data residence on a node is termed, data locality.

To determine data locality, a virtualization scheduler can run multiple queries to identify where portions of files (e.g., data blocks) reside among nodes within a cluster of physical nodes in a DFS. The time to query all nodes and relevant data blocks during the VM scheduling action can be extensive. For example, using a function such as, but not limited to, "getFileBlockLocations( )", to determine data locality in a DFS can consume over two hours to search all data blocks of 10 TB dataset where block size is 128 MB, file size being 1 TB files and assuming 0.1 seconds retrieval time per data block. With the prior example, the time to determine data locality before VM instance creation and/or VM data processing can initiate on a physical node can be unsatisfactory in big data environments.

SUMMARY

As disclosed herein, a method, for fileset based data locality management in Distributed File Systems, the method comprising: receiving, by data locality manager, one or more fileset identifiers and associated one or more block allocation information, for storing in one or more data block locality tables; determining, by the data locality manager, one or more data block locality factors based on the one or more fileset identifiers and the one or more block allocation information, creating a collection of the one or more data block locality factors; storing, by the data locality manager, the collection of the one or more data block locality factors in the one or more data block locality tables; receiving, by the data locality manager, the one or more fileset identifiers for determining the collection of the one or more data block locality factors associated to the one or more fileset identifiers and outputting, by the data locality manager, the collection of the one or more data block locality factors. A computer system and a computer program product corresponding to the above method are also disclosed herein.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
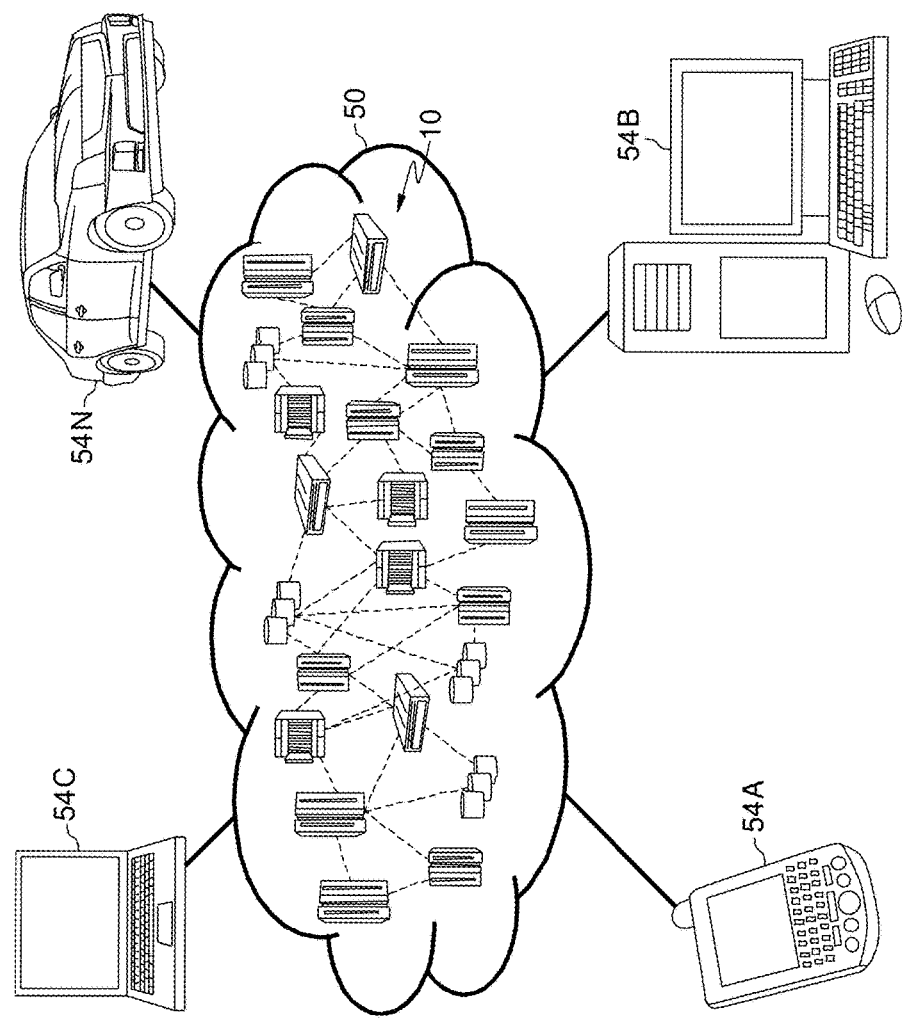
FIG. 1 illustrates a cloud computing environment according to an embodiment of the present invention.

Embodiments of the present invention provide an approach to monitor and track directory/fileset data locality for distributed file systems to enable an efficient to Hyper-Converged system operation. Distributed file system data block allocations can be tracked and stored during DFS operation. As VM/job scheduling operations execute data locality can be retrieved from fileset locality table(s) to enable a fast data locality look-up versus performing exhaustive and discrete data locality node scans.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and services) that can be rapidly provisioned and released with minimal management effort or interaction with a provider of the service. This cloud model may include at least five characteristics, at least three service models and at least four deployment models.

Characteristics are as follows:

On-demand self-service: a cloud consumer can unilaterally provision computing capabilities, such as, server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth and active user accounts). Resource usage can be monitored, controlled and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as, a web browser (e.g., web-based e-mail). The consumer does not manage or control the underlying cloud infrastructure including network, servers, operating systems, storage or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems or storage, but has control over the deployed applications and possibly application hosting environment configurations.

Infrastructure as a Service (IaaS): the capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage, deployed applications and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community or public) that remain unique entities but are bound together by standardized or proprietary technology that enables data and application portability (e.g., cloud bursting for load-balancing between clouds).

A cloud computing environment is service oriented with a focus on statelessness, low coupling, modularity and semantic interoperability. At the heart of cloud computing is an infrastructure that includes a network of interconnected nodes.

Embodiments of the present invention will now be described in detail with reference to the figures. It should be noted that references in the specification to "an exemplary embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure or characteristic is described in connection with an embodiment, it is submitted that it is within the knowledge of one skilled in the art to affect such feature, structure or characteristic in connection with other embodiments whether or not explicitly described.

FIG. 1 illustrates a cloud computing environment according to an embodiment of the present invention. As shown, illustrative cloud computing environment 50 comprises one or more cloud computing nodes 10 with which local computing devices used by cloud consumers, such as, for example, personal digital assistant (PDA) or cellular telephone 54A, desktop computer 54B, laptop computer 54C and/or automobile computer system 54N may communicate. Computing nodes 10 may communicate with one another. They may be grouped (not shown) physically or virtually, in one or more networks, such as, Private, Community, Public or Hybrid clouds as described hereinabove or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
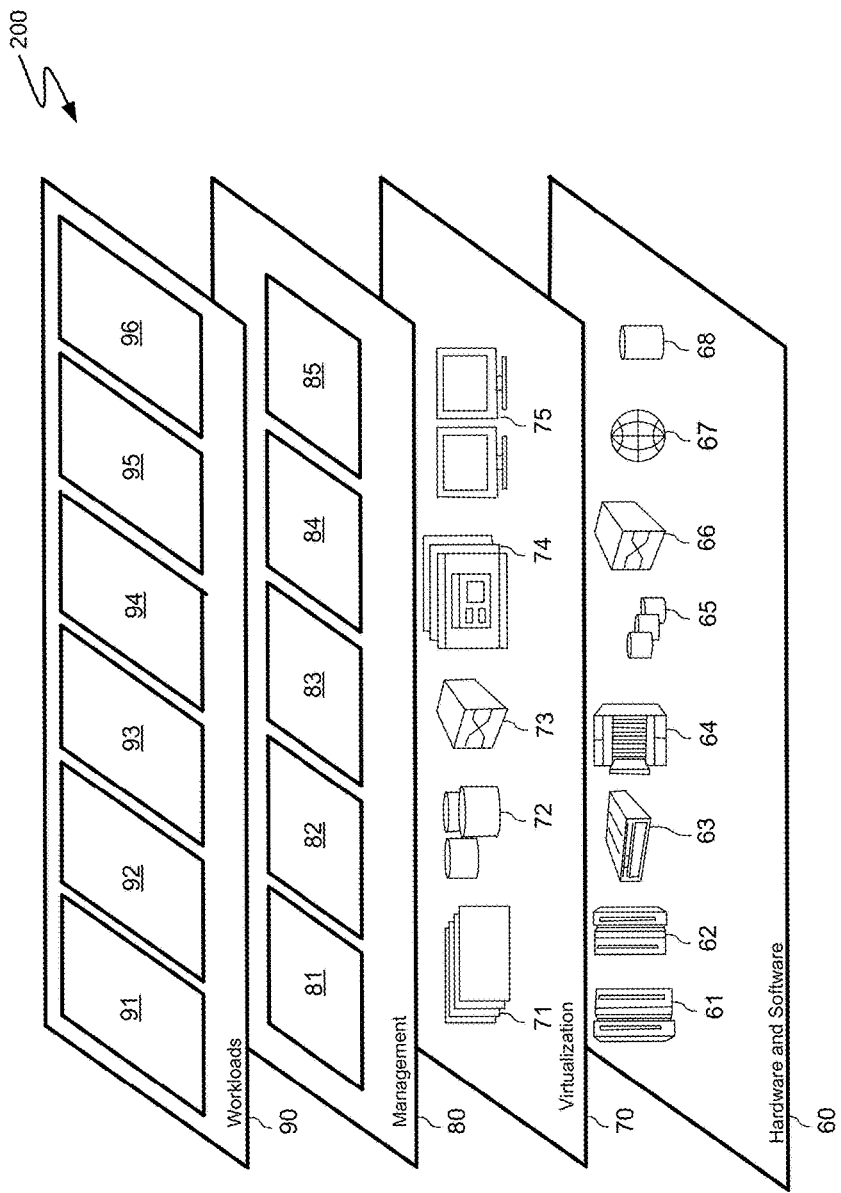
FIG. 2 illustrates abstraction model layers according to an embodiment of the present invention.

FIG. 2 illustrates abstraction model layers according to an embodiment of the present invention and comprises a set of functional abstraction layers provided by cloud computing environment 50 (FIG. 1). It should be understood in advance that the components, layers and functions shown in FIG. 2 are intended to be illustrative only and embodiments of the present invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85, provide pre-arrangement for and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and DATA LOCALITY MANAGER 96. DATA LOCALITY MANAGER 96 implements the functions described above for logging DFS fileset block allocations, maintaining related data locality information and/or data locality factors. Further, DATA LOCALITY MANAGER 96 searches and retrieves a collection of data locality factors from maintained data block location tables to enable efficient H-C systems container manager operation.

Figure 3:
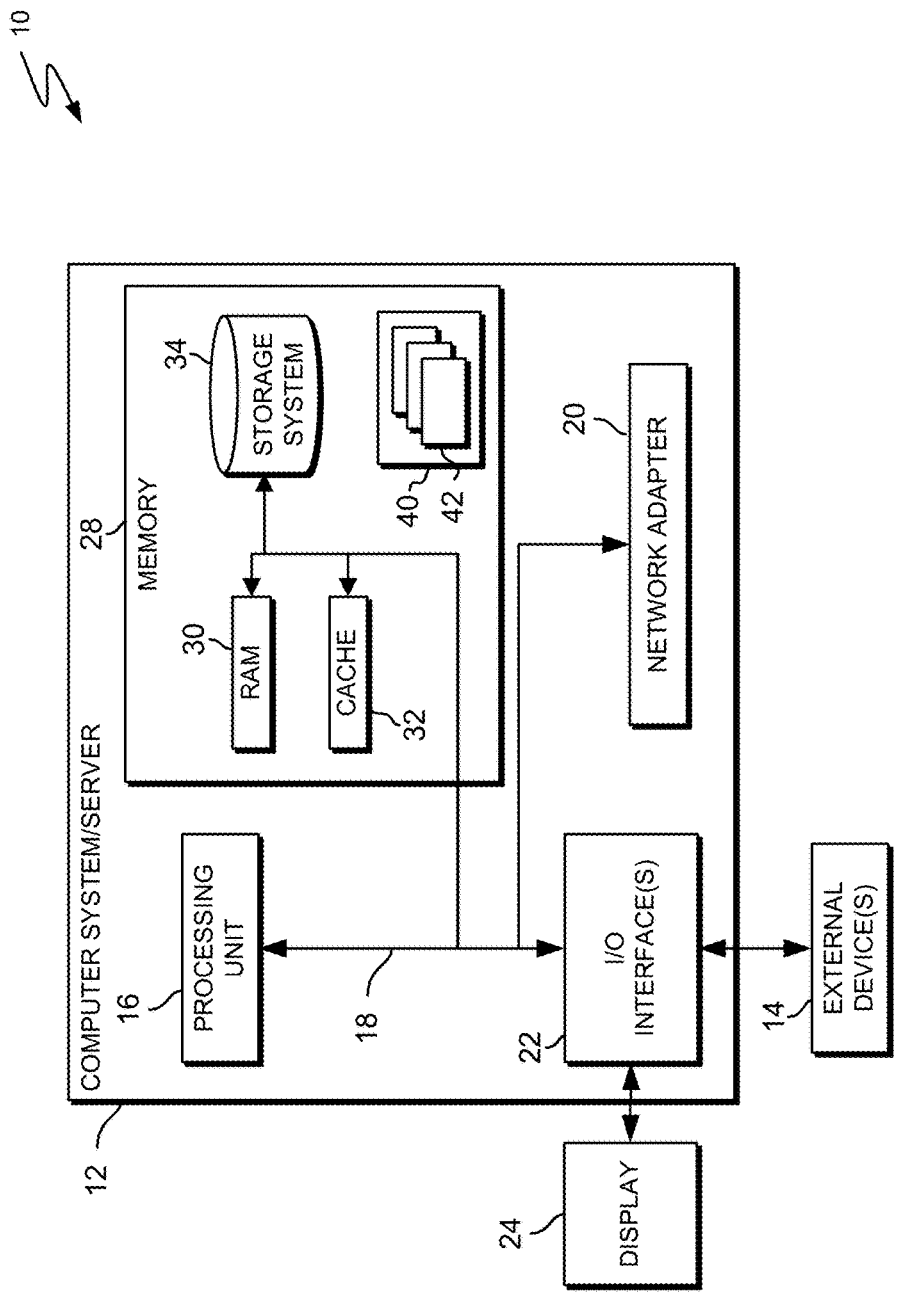
FIG. 3 illustrates a cloud computing node according to an embodiment of the present invention.

FIG. 3 illustrates a cloud computing node according to an embodiment of the present invention. In example cloud computing node 10, is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as, program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as, random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as, a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set of one or more program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as, a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as, a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
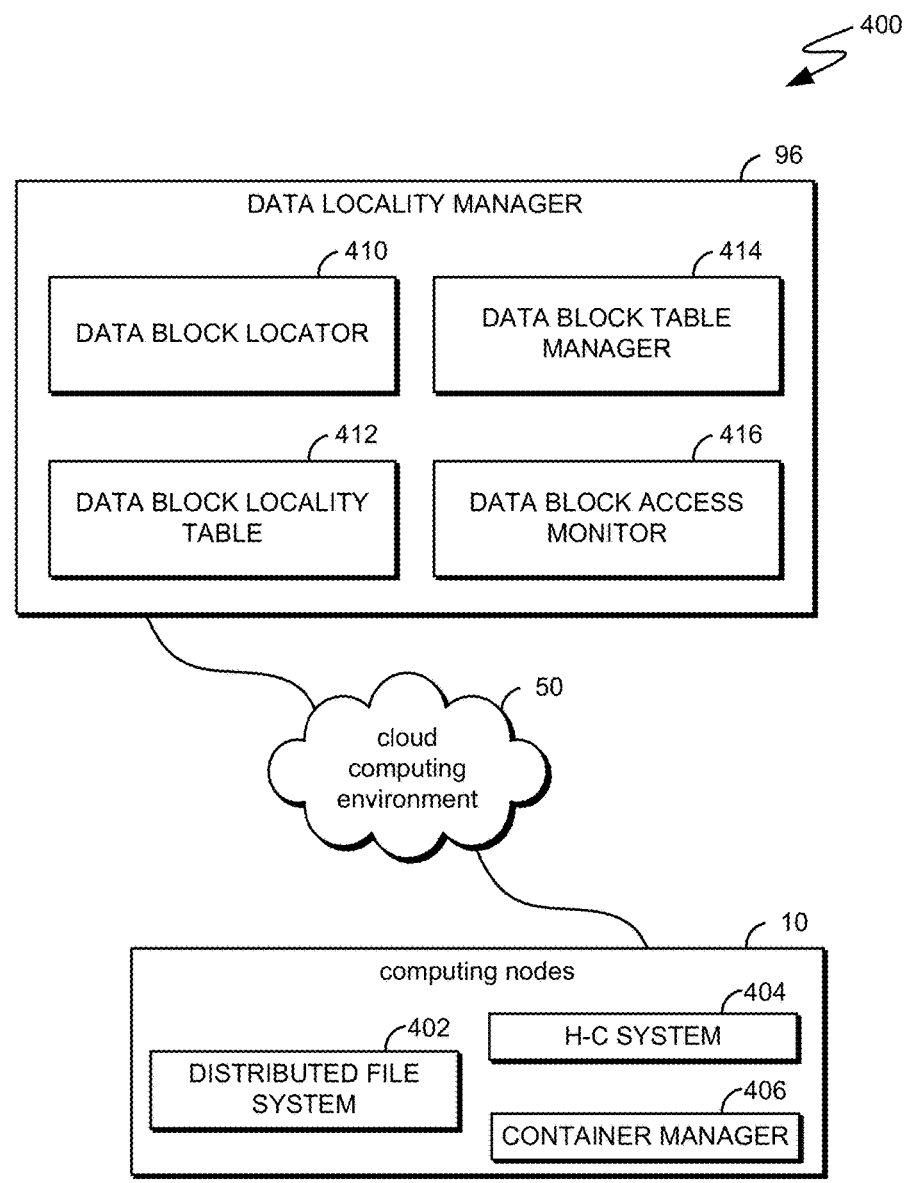
FIG. 4 illustrates a functional block diagram environment of cloud computing nodes, in accordance with an embodiment of the present invention.

FIG. 4 illustrates a functional block diagram environment of cloud computing nodes, in accordance with an embodiment of the present invention. Computing node environment 400 comprises computing nodes 10 and DATA LOCALITY MANAGER 96 interconnected via cloud computing environment 50. Computing nodes 10 and DATA LOCALITY MANAGER 96 can be operated on desktop computers, laptop computers, specialized computer servers, or the like. In certain embodiments, computing nodes 10 and DATA LOCALITY MANAGER 96 can represent computer systems utilizing clustered computers and components acting as a single pool of seamless resources via cloud computing environment 50. For example, such embodiments can be used in data center, cloud computing, storage area network (SAN), and network attached storage (NAS) applications. In general, computing nodes 10 and DATA LOCALITY MANAGER 96 are representative of any electronic devices, or combination of electronic devices, capable of executing computer readable program instructions, as described in detail with regard to FIG. 3.

In one embodiment of the present invention, computing nodes 10 comprises, DISTRIBUTED FILE SYSTEM 402, H-C SYSTEM 404 and CONTAINER MANAGER 406.

In one embodiment of the present invention, DISTRIBUTED FILE SYSTEM 402 can be a plurality of DISTRIBUTED FILE SYSTEMS 402 within computing nodes 10. DISTRIBUTED FILE SYSTEM 402 can be a file system that can provide access to files shared via a network from multiple hosts. DISTRIBUTED FILE SYSTEMS 402 makes it possible for multiple users and/or applications to share and/or operate on files and data from multiple Virtual Machines. In embodiments of the present invention, DISTRIBUTED FILE SYSTEM 402 can comprise any combination of commercial or custom devices and/or software products operating in frameworks such as, but not limited to, Hadoop distributed file system (HDFS) by Apache Software Foundation and Portable Operating System Interface (POSIX) by the IEEE Computer Society.

In one embodiment of the present invention, CONTAINER MANAGER 406 can be a plurality of CONTAINER MANAGERS 406 within computing nodes 10. CONTAINER MANAGER 406 can be a H-C system application/module performing data locality checking to initiate and/or schedule jobs to create and/or operate VM instances. In embodiments of the present invention, CONTAINER MANAGER 406 can comprise any combination of commercial or custom devices and/or software products associated with managing VM container environments in H-C systems that can perform data locality checking for tasks during instantiation and operation of H-C system instances. It should be noted that embodiments of the present invention can integrate CONTAINER MANAGER 406 with H-C SYSTEM 404 while FIG. 4 depicts CONTAINER MANAGER 406 as a separate function.

In one embodiment of the present invention, H-C SYSTEM 404 can be a plurality of H-C SYSTEMS 404 within computing nodes 10. H-C SYSTEM 404 can be a H-C system VM container comprising virtualization technologies such as, but not limited to, docker by Docker, Inc. In embodiments of the present invention, H-C SYSTEM 404 can comprise any combination of commercial or custom devices and/or software products associated with H-C system VM container environments. It should be noted that H-C SYSTEM 404 can also comprise one or more container manager function (e.g., CONTAINER MANAGER 406) that performs data locality checking for tasks during operation of H-C system instances.

In one embodiment of the present invention, DATA LOCALITY MANAGER 96 can be a plurality of DATA LOCALITY MANAGERS 96. DATA LOCALITY MANAGER 96 can be a separate and/or integrated tool that can monitor and track fileset and data block allocation/deallocation during operation of DISTRIBUTED FILE SYSTEM 402 in a H-C system architecture. DATA LOCALITY MANAGER 96 can act as an interface toward CONTAINER MANAGER 406 to search data locality of DISTRIBUTED FILE SYSTEM 402. DATA LOCALITY MANAGER 96 can output fileset based data locality in a sorted and/or based on weighting factors to optimize CONTAINER MANAGER 406 data locality related computation.

DATA LOCALITY MANAGER 96 comprises, DATA BLOCK LOCATOR 410, DATA BLOCK LOCALITY TABLE 412, DATA BLOCK TABLE MANAGER 414 and DATA BLOCK ACCESS MONITOR 416. In embodiments of the present invention, DATA LOCALITY MANAGER 96 can comprise any combination of commercial or custom devices and/or software products associated with monitoring, searching and tracking data such as, but not limited to, fileset data block allocations, fileset data block locality factors and fileset access statistics.

In one embodiment of the present invention, DATA BLOCK LOCATOR 410 can be a plurality of DATA BLOCK LOCATORS 410 within DATA LOCALITY MANAGER 96. DATA BLOCK LOCATOR 410 can receive requests for filesets by CONTAINER MANAGER 406 and can receive data block location information from DISTRIBUTED FILE SYSTEM 402. DATA BLOCK LOCATOR 410 can send processing instructions toward DATA BLOCK TABLE MANAGER 414 based on data locality request task type. Further, DATA BLOCK LOCATOR 410 can output data block locality information stored in DATA BLOCK LOCALITY TABLE 412 and/or data locality processing status toward CONTAINER MANAGER 406 and/or DISTRIBUTED FILE SYSTEM 402.

In one embodiment of the present invention, DATA BLOCK LOCALITY TABLE 412 can be a plurality of DATA BLOCK LOCALITY TABLES 412 within DATA LOCALITY MANAGER 96. DATA BLOCK LOCALITY TABLE 412 can store data locality related information comprising DISTRIBUTED FILE SYSTEM 402. DATA BLOCK LOCALITY TABLE 412 can comprise information such as, but not limited to, fileset identifiers, node identifiers, block count, byte count, usage weighting factors and data directory (e.g., root directory) identifiers of H-C VM systems. DATA BLOCK LOCALITY TABLE 412 can be separate and/or integrated with DATA LOCALITY MANAGER 96. DATA BLOCK LOCALITY TABLE 412 can be created and updated when a DFS is created, physical nodes are added, removed, reassigned and when DFS ingests new data. DATA BLOCK LOCALITY TABLE 412 can remain synchronized during DFS operate and it should be noted that in an example where a DFS disk/node is inoperable, embodiments of the present invention can enable System Administrators to synchronize DATA BLOCK LOCALITY TABLE 412 with DISTRIBUTED FILE SYSTEM 402 via DATA LOCALITY MANAGER 96. DATA BLOCK LOCALITY TABLE 412 can be operated as separate and/or integrated database(s) and/or table(s) associated with DISTRIBUTED FILE SYSTEM 402.

In one embodiment of the present invention, DATA BLOCK TABLE MANAGER 414 can be a plurality of DATA BLOCK TABLE MANAGERS 414 within DATA LOCALITY MANAGER 96. DATA BLOCK TABLE MANAGER 414 can perform operations such as, but not limited to, search, create/allocate, change and delete/unallocate fileset data block locality records stored in DATA BLOCK LOCALITY TABLE 412. DATA BLOCK TABLE MANAGER 414 can send search and/or maintenance results toward DATA BLOCK LOCATOR 410. Further, DATA BLOCK TABLE MANAGER 414 can receive data block access usage information from DATA BLOCK ACCESS MONITOR 416 to update usage weighting factors that can be stored in DATA BLOCK LOCALITY TABLE 412.

In one embodiment of the present invention, DATA BLOCK ACCESS MONITOR 416 can be a plurality of DATA BLOCK ACCESS MONITORS 416 within DATA LOCALITY MANAGER 96. DATA BLOCK ACCESS MONITOR 416 can receive data block usage/access information from DATA BLOCK TABLE MANAGER 414 as DISTRIBUTED FILE SYSTEM 402 access fileset data blocks. DATA BLOCK ACCESS MONITOR 416 can calculate and/or update usage weighting factors and can send calculation results toward DATA BLOCK TABLE MANAGER 414 for storage in DATA BLOCK LOCALITY TABLE 412. It should be noted that usage weighting factors can be used by embodiments of the present invention to prioritize data block locality selection for CONTAINER MANAGER 406 during H-C SYSTEM 404. Weight can be defined by factors such as, but not limited to, DISTRIBUTED FILE SYSTEM 402 fileset access frequency, VM instance fileset access frequency, number of jobs running by VM instances/schedulers and VM instance fileset read/write counts. It should be noted that weight calculations can incorporate time based factors to refresh determined weight values. For example, weight values can be measured periodically (e.g., 24 hour increments) to determine frequency of recently accessed data versus formerly accessed data (e.g., moving average and/or weighted average).

Figures 5A, 5B:
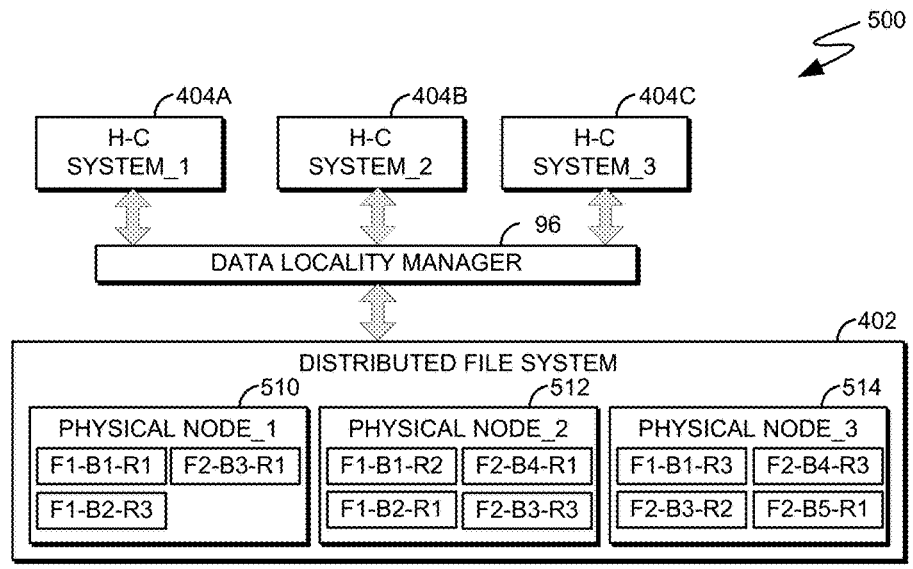
FIG. 5A illustrates fileset based data locality manager use in a Hyper-Converged architecture, in accordance with an embodiment of the present invention.
FIG. 5B illustrates a sample data block locality table, in accordance with an embodiment of the present invention.

FIG. 5A illustrates fileset based data locality manager use in a Hyper-Converged architecture, in accordance with an embodiment of the present invention. The Hyper-Converged architecture 500 represents one embodiment of the present invention where DATA LOCALITY MANAGER 96 operates as an Application Programming Interface (API). The Hyper-Converged architecture 500 illustrates instances of H-C SYSTEM 404, depicted as items H-C SYSTEM_1 404A, H-C SYSTEM_2 404B and H-C SYSTEM_3 404C. DATA LOCALITY MANAGER 96 is depicted as communicating between associated instances of items H-C SYSTEM_1 404A, H-C SYSTEM_2 404B and H-C SYSTEM_3 404C and DISTRIBUTED FILE SYSTEM 402.

DISTRIBUTED FILE SYSTEM 402 comprises physical nodes depicted as items PHYSICAL NODE_1 510, PHYSICAL NODE_2 512 and PHYSICAL NODE_3 514. Each physical node comprises file replicas that are located in file blocks in DISTRIBUTED FILE SYSTEM 402. For example, item PHYSICAL NODE_1 510 comprises "F1-B1-R1" which can represent File 1 located in Block 1 and is a first replica of the file block 1 whereas "F1-B1-R2" shown in item PHYSICAL NODE_2 512 is an equivalent file segment identified as "F1-B1-R1" (e.g., R2 identifying replica 2). In another example, item PHYSICAL NODE_1 510 comprises "F1-B1-R1" and "F1-B2-R3" where a portion of file 1 are stored in Blocks 1 and 2 (e.g., B1 and B2) however block 2 is a third replica of file 1. Note that F1-B2-R1 is not depicted and may reside on another physical node in DISTRIBUTED FILE SYSTEM 402. Item DISTRIBUTED FILE SYSTEM 402 manages fileset locations on physical nodes where DATA LOCALITY MANAGER 96 stores and maintains fileset based data locality mapping of each respective data block consuming instance of H-C SYSTEM 404. In the example, three replicas of "Block F" (e.g., B1) are located in nodes 1, 2 and 3 (e.g., items PHYSICAL NODE_1 510, PHYSICAL NODE_2 512 and PHYSICAL NODE_3) 514 defining data locality of "Block F" for "File F" (e.g., F1) whereas "Block 5" (e.g., B5) for "File 2" (e.g., F2) comprises one data locality (PHYSICAL NODE_3). As each H-C SYSTEM 404 instance is launched and/or operates, data locality requests can be sent toward DATA LOCALITY MANAGER 96 where data locality for a fileset can be retrieved and output can be sent toward the requestor. Further, as DISTRIBUTED FILE SYSTEM 402 performs operations such as, but not limited to, access file blocks, create fileset replicas, moves data blocks (e.g., restriping and/or re-organization) and creates fileset data block allocations on physical nodes, DATA LOCALITY MANAGER 96 can receive data locality information (e.g., block allocation information) to determine data locality factors associated to fileset identifiers. Using the data locality factors, DATA LOCALITY MANAGER 96 can create fileset and/or data node collections for storage in DATA BLOCK LOCALITY TABLE 412.

FIG. 5B illustrates a sample data block locality table, in accordance with an embodiment of the present invention. Data block locality table 550 represents a sample DATA BLOCK LOCALITY TABLE 412 based on DISTRIBUTED FILE SYSTEM 402 data block mapping of filesets comprising one or more VM instances of H-C SYSTEM 404. Data block locality table 550 comprises items Fileset ID 552, Node ID 554, Blocks 556, Total bytes 558, Weight 560 and Data_directory 562.

Item Fileset ID 552 represents fileset identifiers of data stored in DISTRIBUTED FILE SYSTEM 402 and item Node ID 554 indicates the physical nodes where replicas of filesets are stored. Item Blocks 556 depicts the number of data blocks allocated to a physical node for an associated fileset ID. Item Total bytes 558 can be the total bytes (e.g., MB, GB, TB, etc.) where the byte count can be based on factors such as, but not limited to, block size and number of block allocated.

Item Weight 560 can be a record of statistical activity as a factor that can be used to favor one data locality node selection from another. Result calculations received from DATA BLOCK ACCESS MONITOR 416 can be stored in item Weight 560.

Item Data_directory 562 depicts a root directory associated to a H-C VM system instance (e.g., H-C SYSTEM 404). It should be noted that H-C VM instances can read and/or write data to/from the same directory. For example, "/gpfs/hadoop1" can be the root directory for hadoop applications in a docker instance cluster. It should also be noted that "/gpfs/hadoop1" associated filesets can reside on multiple nodes. In this example H-C SYSTEM_1 404A and H-C SYSTEM_1 404C can be separate docker instances where the same data directory is assigned, however each docker instance can access different data block replicas in different physical nodes.

Figure 6:
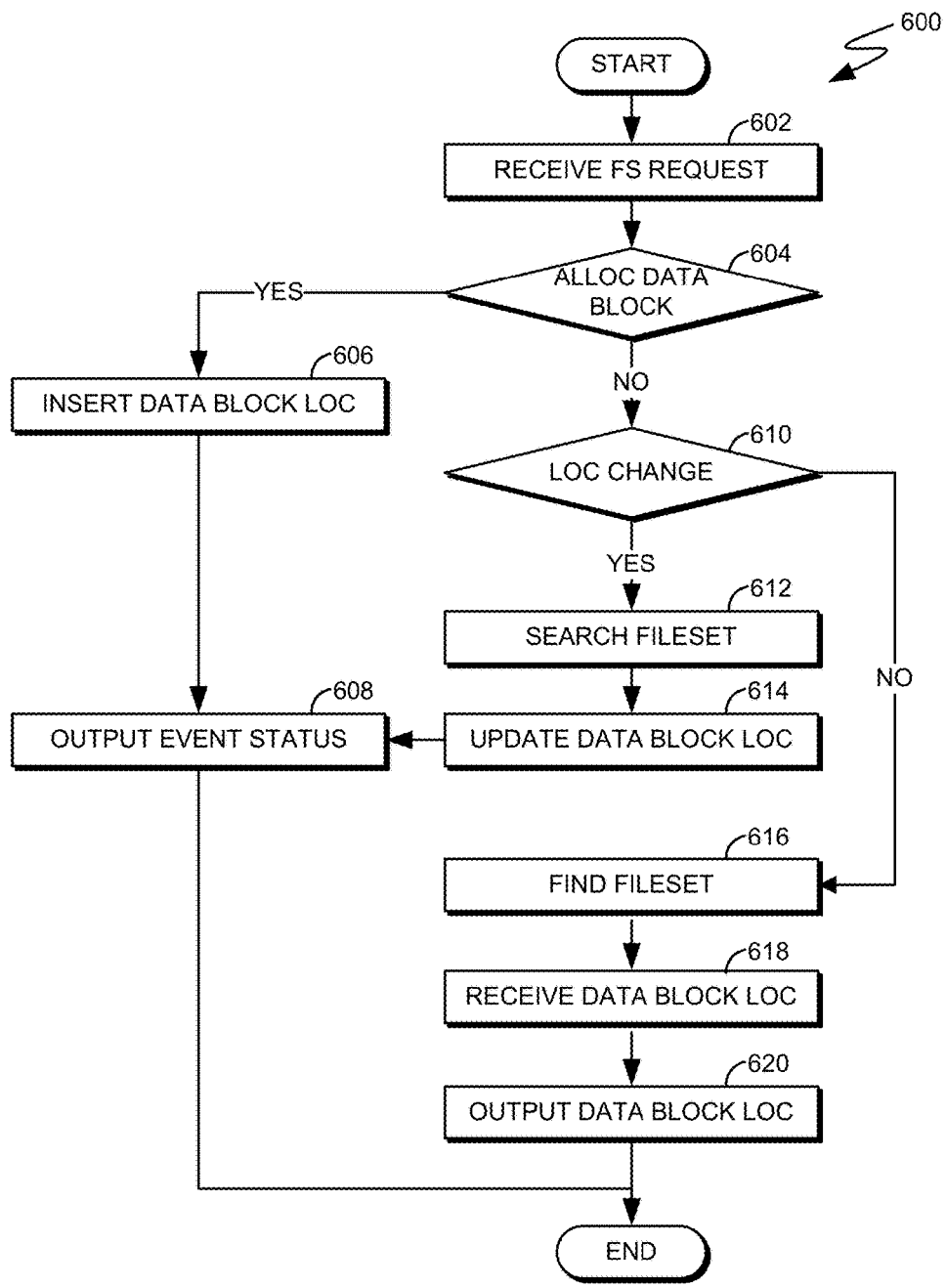
FIG. 6 illustrates a flowchart of fileset based data locality manager operation, in accordance with an embodiment of the present invention.

FIG. 6 illustrates a flowchart of fileset based data locality manager operation, in accordance with an embodiment of the present invention. Flow diagram 600 fileset data locality manager processing can be a continuous process operating as an interchange (e.g., API) between DISTRIBUTED FILE SYSTEM 402 and CONTAINER MANAGER 406. It should be noted that the flowchart operates and maintains DATA BLOCK LOCALITY TABLE 412 which represents the current data block and node mapping of DISTRIBUTED FILE SYSTEM 402 data locality and data locality related information as the DFS operates. Flow diagram 600 fileset data locality manager processing operates as DFS performs database read, update, create and delete operations and as CONTAINER MANAGER 406 requests data locality information.

Operation RECEIVE FS REQUEST 602, can receive one or more fileset requests data locality request task type. Data locality request task types can comprise input such as, but not limited to, fileset identifiers, block allocation information, block allocation change information, block deallocation identifiers and fileset access operations. Fileset identifiers can be used alone and in combination with other input such as, but not limited to, Node ID 554 and Data_directory 562 (e.g, block allocation information) to retrieve and maintain data locality information from DATA BLOCK LOCALITY TABLE 412. Block allocation change information can comprise data block move information where DISTRIBUTED FILE SYSTEM 402 moves/replaces data block allocation from one physical node to another (e.g., restripe and/or database re-organization). Block allocation change information can also comprise updates to existing record fields DATA BLOCK LOCALITY TABLE 412. Block deallocation identifiers can comprise block information for removed replicas and/or data blocks related to filesets. Block deallocation releases records in DATA BLOCK LOCALITY TABLE 412 as part of DFS synchronization operation. Fileset access operations can comprise information used for analyzing and/or calculating statistical weights as a result of DISTRIBUTED FILE SYSTEM 402 activities such as, but not limited to, read action, write action, update action and delete action. As H-C SYSTEM 404 instances are created and/or CONTAINER MANAGER 406 operates, data locality requests are received by DATA BLOCK LOCATOR 410. As DISTRIBUTED FILE SYSTEM 402 operates to access, create, update, delete and replicate data blocks in physical nodes DATA BLOCK LOCATOR 410 receives fileset identifiers and associated data block allocation information. Further, there are conditions when DISTRIBUTED FILE SYSTEM 402 can move data blocks to alternate physical nodes (e.g., a disk failure occurs). In a data block move case, DATA BLOCK LOCATOR 410 can receive data block move requests indicating former (e.g., data block allocation information) and present (e.g., a second data block allocation information) data block locality. Operation RECEIVE FS REQUEST 602 can also receive data block access information as DISTRIBUTED FILE SYSTEM 402 operates with DATA BLOCK ACCESS MONITOR 416 to maintain DATA BLOCK LOCALITY TABLE 412 fileset usage weighting factors (e.g., Weight 560).

Decision operation ALLOC DATA BLOCK 604, can determine if a fileset request type is a data block creation and/or replicate action (e.g., a new entry to DATA BLOCK LOCALITY TABLE 412). If the request type is for a new data block entry, then operation flow proceeds toward operation INSERT DATA BLOCK LOC 606. Otherwise, operation flow proceeds toward operation LOC CHANGE 610.

Operation INSERT DATA BLOCK LOC 606, can execute DATA BLOCK TABLE MANAGER 414 to insert new data block allocation information toward DATA BLOCK LOCALITY TABLE 412. As DATA BLOCK TABLE MANAGER 414 operates DATA BLOCK LOCALITY TABLE 412, data block locality factors can be created and/or updated to manage collections of data block locality factors where factors such as, but not limited to, block count, byte count, usage weighting factors and data directory (e.g., root directory) identifiers can associate fileset identifiers, node identifiers for fileset and/or data node retrieval. It should be noted that weight values (e.g., Weight 560) can be updated by information from DATA BLOCK ACCESS MONITOR 416 as records are updated and/or fileset access operations are executed.

Operation OUTPUT EVENT STATUS 608, executed by DATA BLOCK LOCATOR 410, can output a return code to a requesting application (e.g., DISTRIBUTED FILE SYSTEM 402) based on DATA BLOCK LOCALITY TABLE 412 processing results for the insert action(s) (e.g., success, failure, etc.). When Operation OUTPUT EVENT STATUS 608 completes, the operation flow ends.

Decision operation LOC CHANGE 610, can determine if a fileset request type is a data block allocation change/move action (e.g., update an entry in DATA BLOCK LOCALITY TABLE 412). If a fileset request type is a data block allocation change, then operation flow proceeds toward operation SEARCH FILESET 612, otherwise operation flow proceeds toward operation FIND FILESET 616.

Operation SEARCH FILESET 612, can perform a data block locality search request based on data block allocation change information received from an CONTAINER MANAGER 406 instance. DATA BLOCK TABLE MANAGER 414 can search for block allocation block entries based on matching associated specified fileset(s) stored in DATA BLOCK LOCALITY TABLE 412.

Operation UPDATE DATA BLOCK LOC 614, can update the retrieved DATA BLOCK LOCALITY TABLE 412 records from operation SEARCH FILESET 612 based on inputs received. It should be noted that physical node move is performed by changing a node value from former to present value (e.g., block allocation change information). It should be further noted that in some embodiments of the present invention a new entry can be created in DATA BLOCK LOCALITY TABLE 412 as data changes are recorded with former records marked with values such as, but not limited to, deleted and invalid". It should also be noted that weight values and/or fileset access statistics (e.g., Weight 560) can be updated by information received from DATA BLOCK ACCESS MONITOR 416 as DISTRIBUTED FILE SYSTEM 402 records are accessed. Operation UPDATE DATA BLOCK LOC 614 can also execute DISTRIBUTED FILE SYSTEM 402 block deallocations by marking associated DATA BLOCK LOCALITY TABLE 412 records with values such as, but not limited to, unallocated, disabled and unavailable. When operation UPDATE DATA BLOCK LOC 614 completes, the operation flow proceeds toward operation OUTPUT EVENT STATUS 608.

Operation OUTPUT EVENT STATUS 608, executed by DATA BLOCK LOCATOR 410 can output a return code to a requesting application (e.g., DISTRIBUTED FILE SYSTEM 402) based on DATA BLOCK LOCALITY TABLE 412 processing results for the update action(s) (e.g., success, failure, etc.).

Operation FIND FILESET 616, can perform a data block locality search request received from a CONTAINER MANAGER 406 and/or H-C SYSTEM 404 instance based on a fileset identifiers and/or data directory identifiers. DATA BLOCK TABLE MANAGER 414 can perform a search for matching fileset identifier data block entries in DATA BLOCK LOCALITY TABLE 412 to output a collection of data locality information and/or the the physical nodes comprising fileset data blocks of interest (e.g., data block locality factors). Based on search results, CONTAINER MANAGER 406 can identify all nodes comprising fileset(s) of interest to determine which physical node to launch/schedule a process that comprises the largest set of data. For example, H-C SYSTEM_1 404A can operate on PHYSICAL NODE_1 510. When requesting File "F1", DATA LOCALITY MANAGER 96 can search DATA BLOCK LOCALITY TABLE 412 and find 120 blocks of "F1" (e.g., Fileset ID 552) reside on Node ID 554 "N1." It should be noted that some embodiments of the present invention DATA BLOCK LOCALITY TABLE 412 can comprise unavailable records marked with values such as, but not limited to, deleted, invalid, unallocated, disabled and unavailable which can be filtered from operation FIND FILESET 616 results.

Operation RECEIVE DATA BLOCK LOC 618, can receive associated information based on search results from operation FIND FILESET 616 and process a sorting operation to prioritize results based on fileset data locality information magnitudes such as, but not limited to, weighting factor, block count, byte count and data directory. It should be noted that some cases can exist where filesets are not maintained in DATA BLOCK LOCALITY TABLE 412 and in this case, operation FIND FILESET 616 can return "null" results. In an example of a "null" search result, operation RECEIVE DATA BLOCK LOC 618 can respond with actions such as, but not limited to, preserving the result for output and substituting predetermined default data block information.

Operation OUTPUT DATA BLOCK LOC 620, can output a collection of data block locality factors based on fileset identifier and/or data directory identifier information received from operation FIND FILESET 616, for use by a calling application such as, but not limited to, CONTAINER MANAGER 406 and H-C SYSTEM 404. In a case where filesets are not maintained in DATA BLOCK LOCALITY TABLE 412 and a null value result is output, the calling application and can operate without considering fileset data locality. When operation OUTPUT DATA BLOCK LOC 620 completes, the operation flow ends.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as, punchcards or raised structures in a groove having instructions recorded thereon, and any suitable combination of the foregoing. A computer readable storage medium, as used herein, is not to be construed as being transitory signals per se, such as, radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as, Smalltalk, C++ or the like, and conventional procedural programming languages, such as, the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g., a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method, for fileset based data locality management in Distributed File Systems, the method comprising:
   receiving, by data locality manager, one or more fileset identifiers and associated one or more block allocation information, for storing in one or more data block locality tables;
   determining, by the data locality manager, one or more data block locality factors based on the one or more fileset identifiers and the one or more block allocation information, creating a collection of the one or more data block locality factors;
   storing, by the data locality manager, the collection of the one or more data block locality factors in the one or more data block locality tables;
   receiving, by the data locality manager, the one or more fileset identifiers for determining the collection of the one or more data block locality factors associated to the one or more fileset identifiers; and
   outputting, by the data locality manager, the collection of the one or more data block locality factors to an application to access a fileset associated with the one or more fileset identifiers.

2. The method of claim 1, further comprising receiving one or more allocation change information associated to the one or more fileset identifiers for updating the one or more data block locality tables.

3. The method of claim 1, further comprising:
   receiving one or more fileset access operations associated to the one or more fileset identifiers; and
   determining one or more usage weighting factors associated to the collection of the one or more data block locality factors for storing in the one or more data block locality tables.

4. The method of claim 1, wherein the collection of the one or more data block locality factors comprises at least one of one or more block count and one or more byte count.

5. The method of claim 1, further comprising receiving one or more block deallocation identifiers associated to the one or more fileset identifiers for marking the one or more block allocation information as unallocated in the one or more data block locality tables.

6. The method of claim 1, further comprising outputting wherein the collection of the one or more data block locality factors is sorted.

7. The method of claim 3, wherein the one or more fileset access operations comprises at least one of a read action, write action, update action and delete action.

8. A computer program product, for fileset based data locality management in Distributed File Systems, the computer program product comprising:
   one or more computer readable storage media and program instructions stored on the one or more computer readable storage media, the program instructions comprising:
   program instructions to, receive, by data locality manager, one or more fileset identifiers and associated one or more block allocation information, for storing in one or more data block locality tables;
   program instructions to, determine, by the data locality manager, one or more data block locality factors based on the one or more fileset identifiers and the one or more block allocation information, creating a collection of the one or more data block locality factors;

program instructions to, store, by the data locality manager, the collection of the one or more data block locality factors in the one or more data block locality tables;

program instructions to, receive, by the data locality manager, the one or more fileset identifiers for determining the collection of the one or more data block locality factors associated to the one or more fileset identifiers; and program instructions to, output, by the data locality manager, the collection of the one or more data block locality factors to an application to access a fileset associated with the one or more fileset identifiers.

9. The computer program product of claim 8, further comprising program instructions to, receive one or more allocation change information associated to the one or more fileset identifiers for updating the one or more data block locality tables.

10. The computer program product of claim 8, further comprising:
program instructions to, receive one or more fileset access operations associated to the one or more fileset identifiers; and
program instructions to, determine one or more usage weighting factors associated to the collection of the one or more data block locality factors for storing in the one or more data block locality tables.

11. The computer program product of claim 8, wherein the collection of the one or more data block locality factors comprises at least one of one or more block count and one or more byte count.

12. The computer program product of claim 8, further comprising program instructions to, receive one or more block deallocation identifiers associated to the one or more fileset identifiers for marking the one or more block allocation information as unallocated in the one or more data block locality tables.

13. The computer program product of claim 8, further comprising program instructions to, output wherein the collection of the one or more data block locality factors is sorted.

14. The computer program product of claim 10, wherein the one or more fileset access operations comprises at least one of a read action, write action, update action and delete action.

15. A computer system, for fileset based data locality management in Distributed File Systems, the computer system comprising:
one or more computer processors;
one or more computer readable storage media;
program instructions stored on the one or more computer readable storage media for execution by at least one of the one or more computer processors, the program instructions comprising:
program instructions to, receive, by data locality manager, one or more fileset identifiers and associated one or more block allocation information, for storing in one or more data block locality tables;
program instructions to, determine, by the data locality manager, one or more data block locality factors based on the one or more fileset identifiers and the one or more block allocation information, creating a collection of the one or more data block locality factors;
program instructions to, store, by the data locality manager, the collection of the one or more data block locality factors in the one or more data block locality tables;
program instructions to, receive, by the data locality manager, the one or more fileset identifiers for determining the collection of the one or more data block locality factors associated to the one or more fileset identifiers; and
program instructions to, output, by the data locality manager, the collection of the one or more data block locality factors to an application to access a fileset associated with the one or more fileset identifiers.

16. The computer system of claim 15, further comprising program instructions to, receive one or more allocation change information associated to the one or more fileset identifiers for updating the one or more data block locality tables.

17. The computer system of claim 15, further comprising:
program instructions to, receive one or more fileset access operations associated to the one or more fileset identifiers; and
program instructions to, determine one or more usage weighting factors associated to the collection of the one or more data block locality factors for storing in the one or more data block locality tables.

18. The computer system of claim 15, wherein the collection of the one or more data block locality factors comprises at least one of one or more block count and one or more byte count.

19. The computer system of claim 15, further comprising program instructions to, receive one or more block deallocation identifiers associated to the one or more fileset identifiers for marking the one or more block allocation information as unallocated in the one or more data block locality tables.

20. The computer system of claim 15, further comprising program instructions to, output wherein the collection of the one or more data block locality factors is sorted.

* * * * *